United States Patent [19]

Kahng

[11] Patent Number: 5,076,006
[45] Date of Patent: Dec. 31, 1991

[54] FISHING CONNECTOR

[76] Inventor: Gredo W. Kahng, 1510 Spillers La., Houston, Tex. 77043

[21] Appl. No.: 617,674

[22] Filed: Nov. 26, 1990

[51] Int. Cl.⁵ .............................................. A01K 91/00
[52] U.S. Cl. .................................. 43/43.12; 43/44.89; 43/44.9
[58] Field of Search ................. 43/44.83, 44.88, 44.92, 43/44.95, 43.12; 24/115 F, 602

[56] References Cited

U.S. PATENT DOCUMENTS

| | | | |
|---|---|---|---|
| 2,768,468 | 10/1956 | Kibler et al. | 43/44.83 X |
| 3,091,885 | 6/1963 | Ulsh | 43/43.12 X |
| 3,541,720 | 11/1970 | Buffet | 43/43.12 X |
| 3,648,398 | 3/1972 | Newell | 43/43.12 |
| 3,688,434 | 9/1972 | Le Vau | 43/43.15 X |
| 3,925,921 | 12/1975 | Tucker | 43/43.12 |
| 4,125,958 | 11/1978 | Côté43 | 43.12/ |

Primary Examiner—Richard K. Seidel
Assistant Examiner—Patty E. Hong

[57] ABSTRACT

An elongated fishing connector constructed from a plastic material molded or cast upon metal terminal members where the terminal metal terminal members can be molded or cast into the ends of the connector. The connector is separable or breakable in a mid section at a predetermined force to allow severance prior to reaching the breaking strength of the fishing line. Alternately, a terminal member is separable from the connector body at a predetermined force. A breakable line can be utilized internally in the connector body.

5 Claims, 1 Drawing Sheet

FISHING CONNECTOR

FIELD OF THE INVENTION

This invention relates to fishing devices and more particularly to releasable connectors for use with fishing devices.

BACKGROUND OF THE PRESENT INVENTION

In both fresh water and salt water fishing an angler utilizes tackle which typically includes a hook and sinker arrangement of some sort which are attached to a fishing line. There are a variety of systems for attaching hook and sinkers to a fishing line which include a direct in-line attachment to the fishing line or attachment of a "leader" which carries the hook and a sinker.

One of the minor discomforts of the pleasures of fishing is the loss of a hook and/or sinker as the result of an underwater obstacle or snag and the result and breakage of the fishing line. Typically, the fishing line has a lower breaking strength than a leader. In some instances the hooks and/or sinkers are attached to the leader by swivels and utilize high test strength special leader line and snap rings which can be used to attach hooks or sinkers. With the fancier leader rigs, the snagging of a hook or sinker typically can result in a breaking of the fishing line above the leader assembly with the loss of the entire leader rig together with a loss of patience of the angler.

When an underwater snag in a fishing operation does occur, the angler typically wants to save the entire rig and will try to release the hook or sinker from the snag and will lose valuable fishing time trying to release the snag to recover the leader rig because with the more expensive and complicated leader rigs, the angler does not wish to lose the entire rig because of a snag. In addition to cost, when the fishing line breaks above the leader rig, time is also lost in assembling an entire and complete new leader rig.

DESCRIPTION OF THE PRESENT INVENTION

The present invention is embodied in an elongated interconnecting body which is constructed of flexible, water resistant, non-buoyant plastic material where the interconnecting body has a connector means at one end of the body and a connector means, a hook or a sinker at the other end of the interconnecting body. The plastic material is formed with a weakened mid section so as to be separable upon the application of a predetermined force to the ends of the interconnecting body. The plastic material can be made with fluorescent or colored material or can be made of material with a clear or a black color.

In operation where an interconnecting body member is utilized, the occurrence of a snag results only in the loss of the attached part where the body member separates predetermined breaking force.

DESCRIPTION OF THE PRESENT INVENTION

Figure 1:
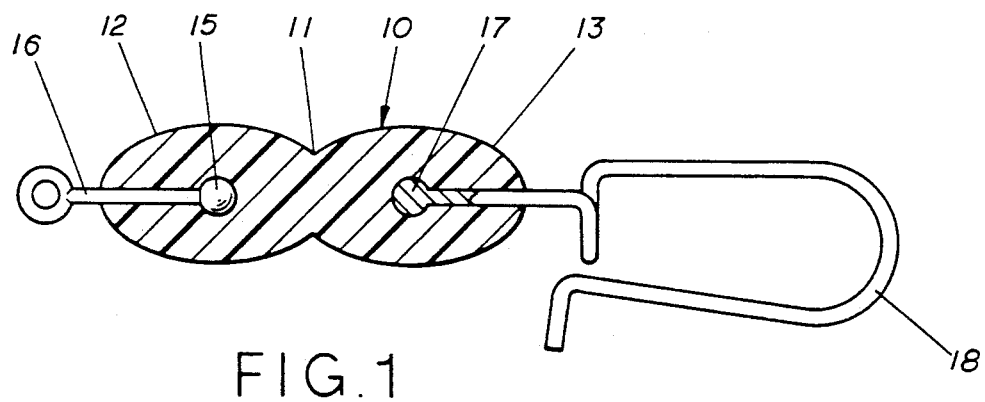
FIG. 1 is an illustration of the present invention in which the plastic body member is molded to a eyelet and to a snap ring.

Referring now to the drawings, an interconnecting body member 10 is made of a plastic material such as a polypropylene or an elastomer which is semi-rigid with some flexability, water resistant and non-buoyant. The selection of a number of appropriate plastic materials will be apparent from the description to follow. In FIG. 1, the desired shape of a body member 10 is illustrated as peanut shaped configuration where there is a narrow section or narrower necked down connecting portion 11 located midway between the end body portions 12 and 13 of the body member 10. The connecting portion 11 is a defined cross sectional area for which a predetermined breaking or separating force of the member 10 can be determined. The breaking or separation force required to separate the body member into two parts can be regulated not only by the configuration of the mid portion of the body member but also by the parting (yield) strength of the material utilized in the construction of the body member. The body member 10 at one end is molded or cast about the enlarged end 15 of an eyelet. At the other end the body member is molded or cast about the enlarged terminal end 17 of a snap fastener 18. The enlarged ends 15 and 17 within the molded body member 10 provide a retention force in the body member 10 which is greater than the separation force required at the narrowed down end portion 11 of the body member.

If desired, the breaking or parting strength of plastic material can be high and the terminal ends can be sized relative to the retaining cavity so that a terminal end 15 or 17 can be pulled from the body member 10 upon the application of a predetermined force.

Figure 2:
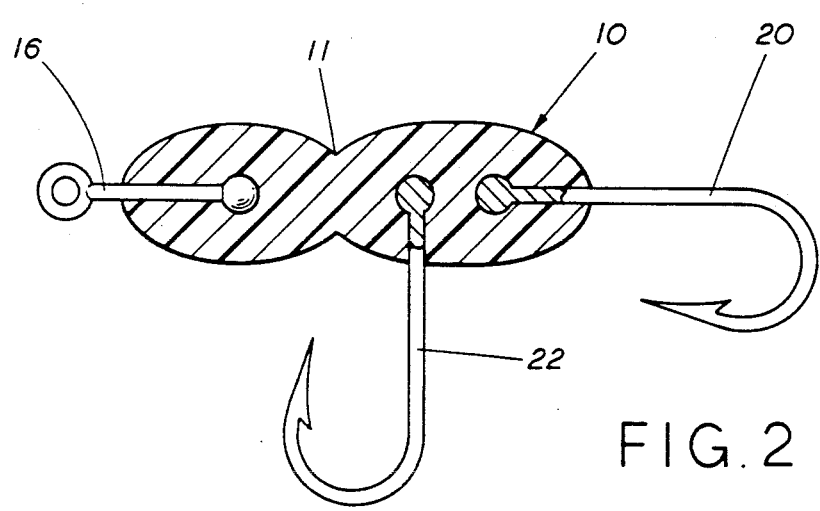
FIG. 2 is an illustration in cross section of a body member which is molded to an eyelet and to a fishing hook.

As shown in FIG. 2, the body member 10 can be molded or cast about one or more hooks 20 and 22. In this embodiment the plastic material can be constructed of a material with a color designed to attract fish which can be, for example, fluorescent, striped or other color variations as commonly found in the plastic worms. Alternatively, the plastic material can be clear or black to become invisible to fish.

Figure 3:
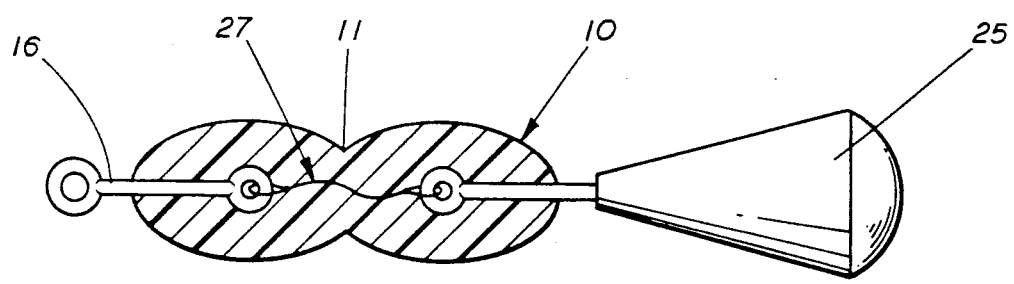
FIG. 3 is an illustration of a body member which is molded to an eyelet and to a weight and illustrates another form of the invention.

As shown in FIG. 3, the plastic body 10 can be molded or cast about an eyelet 16 at one end and about a sinker or weight attachment 25 at the other end in a similar manner as described before. In the embodiment of FIG. 3, a fishing line member 27 of a desired breaking strength is attached to eyelets on the metal end parts 16 and 25. The body member 10 is arranged to part as described before but at a lower predetermined force than required to part the line 27. Thereafter the line 27 can be parted by applying the selected predetermined forces.

Figure 4:
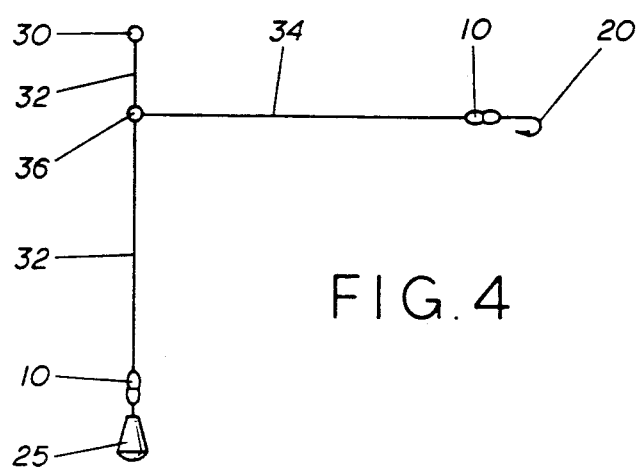
FIG. 4 is a schematic illustration of a fishing rig which may be employed with the present invention.

Referring now to FIG. 4, a swivel connection at 30 connects to a high strength leader line material 32 which can be provided with a connector 10 with a weight 25 at its end as shown in FIG. 3. A side leader, line 34 is attached the main leader line 32 in any conventional manner at 36. The leader line 34 can be attached by a body member 10 with a hook 20 or to a snap member 18 as shown in FIG. 1 or 2 for attachment of a hook.

In use, should the weight 25 become snagged in an underwater obstacle, the body member 10 will elongate under the pulling force and ultimately sever at the narrow point 11 in the body member or in the alternative construction, the hook member or the socket will be removed upon a predetermined force from the body member. Thus snagging of a sinker or weight 25, for example, will permit retrieval of the remainder of the rig and hook instead of loss of the entire set-up. Similarly, if the hook 20 becomes snagged, the member would break or part and the sinker 25 could be reclaimed. It is, of course, obvious that the connector system can be utilized at the swivel point, or with a swivel, or at any desired location in a fishing rig.

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A fishing connector for use with a fishing line having predetermined first breaking force where said fishing line is coupled to a fishing device by the fishing connector, said fishing connector comprising:

an elongated one-piece body member constructed from a plastic material having flexibility, water resistance and non-buoyancy characteristics;

said body member having a mid length section constructed and arranged with a reduced cross section for separation at a predetermined second breaking force where said second breaking force is less than said first breaking force so that said one-piece body member can be severed at said mid length section without requiring said fishing line to be parted; and means embedded in the ends of said body member including metal parts with openings for respectively coupling to a fishing line and to a fishing device.

2. The fishing connector as set forth in claim 1 wherein said metal parts are connected together within the body member by a line member, said line member having a predetermined third breaking force which is greater than said second breaking force.

3. The fishing connector as set forth in claim 1 wherein said plastic material contains fluorescent characteristics and said body member is sized to display such fluorescent characteristics for attracting fish.

4. The fishing connector as set forth in claim 1 wherein said plastic material is clear or black in color presenting an invisible appearance to fish.

5. The fishing connector as set forth in claim 1 wherein said metal parts include an eyelet and a fishing weight.

* * * * *